Nov. 12, 1968 R. V. QUINLAN 3,410,953

TRANSMISSION TIME REDUCTION SYSTEM AND METHOD

Filed Oct. 18, 1965 7 Sheets-Sheet 1

INVENTOR
ROBERT V. QUINLAN

BY Hood, Gust & Irish

ATTORNEYS

INVENTOR
ROBERT V. QUINLAN
BY Hood, Gust & Irish
ATTORNEYS

INVENTOR
ROBERT V. QUINLAN
BY Hood, Gust & Irish
ATTORNEYS

INVENTOR
ROBERT V. QUINLAN
BY Hood, Gust & Irish
ATTORNEYS

Nov. 12, 1968 R. V. QUINLAN 3,410,953

TRANSMISSION TIME REDUCTION SYSTEM AND METHOD

Filed Oct. 18, 1965 7 Sheets-Sheet 5

INVENTOR
ROBERT V. QUINLAN
BY Hood, Gust & Irish
ATTORNEYS

Nov. 12, 1968 R. V. QUINLAN 3,410,953

TRANSMISSION TIME REDUCTION SYSTEM AND METHOD

Filed Oct. 18, 1965 7 Sheets-Sheet 6

INVENTOR
ROBERT V. QUINLAN

BY Hood, Gust & Irish

ATTORNEYS

Nov. 12, 1968 R. V. QUINLAN 3,410,953

TRANSMISSION TIME REDUCTION SYSTEM AND METHOD

Filed Oct. 18, 1965

7 Sheets-Sheet 7

INVENTOR
ROBERT V. QUINLAN
BY Wood, Herst & Irish
ATTORNEYS

United States Patent Office 3,410,953

Patented Nov. 12, 1968

3,410,953

TRANSMISSION TIME REDUCTION SYSTEM AND METHOD

Robert V. Quinlan, Fort Wayne, Ind., assignor to International Telephone and Telegraph Corporation, a corporation of Delaware Filed Oct. 18, 1965, Ser. No. 496,910
19 Claims. (Cl. 178—6.8)

This invention relates generally to information transmission systems and methods, and more particularly to a system and method for reducing the transmission time and/or bandwidth of time-based electrical signals employed in information transmission systems.

Time-based electrical signals are utilized in certain information transmission systems including data transmission systems and television systems. Conventional data transmission systems employ binary pulses of fixed duration in coded sequences whereas conventional television systems employ pulses of varying duration.

In both data transmission and television systems, it is frequently desirable to provide minimum transmission time. Pulse width is the reciprocal of bandwidth, pulse width in turn being directly proportional to transmitting speed. Thus, when transmitting pulsed information-conveying signals over a communication facility, the maximum transmission rate is governed by the upper cut-off frequency of the system, i.e., as the cut-off frequency of the system is lowered, the minimum pulse width which is transmittable is increased. Thus, transmission of binary coded data at the requisite high speed and transmission of the minimum sized television picture element at fast scanning rates with optimum resolution has involved narrow pulses and a corresponding wide band of signal frequencies, thus in turn necessitating employment of a wide-band transmission facility such as a microwave radio link or coaxial cable. Such wide-band transmission facilities are expensive and furthermore are not always readily available or feasible. There are instances where it is desirable to transmit such information-conveying pulses over narrow band facilities, such as ordinary telephone lines. In the case of binary coded data transmission systems, this has required operation of the transmitting and receiving apparatus as a correspondingly low speed, and, in the case of television systems, has necessitated the employment of slow scanning rates.

Most binary coded data and most images to be transmitted by television, particularly printed and written documents such as an ordinary typewritten page, include a substantial amount of redundant information, such as the background or "white" color upon which the contrasting or "black" intelligence information appears. A typical typewritten page is over eighty percent "white." In order to provide faster transmission rates, and/or a narrower transmission bandwith, various transmission time-bandwith compression techniques have been proposed in which a predetermined amount of redundant information in the initial information-conveying signal is detected and transmitted as a single signal element. One such system, described and illustrated in application Ser. No. 385,625, now Patent Number 3,339,017, of the present applicant, filed July 28, 1964, and assigned to the assignee of the present application, employs two scanning speeds, i.e., a slow scanning speed so that the minimum size "black" picture element provides a pulse of sufficient width to be transmittable within the bandwidth of the transmission facility, and a fast scanning speed for transmitting redundant information, such as long runs of "white" information. In that system, however, a separate video signal level is employed during scanning at the fast rate, and thus, for "black and white" copy, a three level or ternary video signal is required. However, when a ternary signal is utilized, the signal-to-noise ratio must be increased over a binary signal for an equivalent error rate.

It is therefore desirable to provide a system and method for reducing the transmission time and/or bandwidth of time-based information-conveying electrical signals employing dual rate signal generation, but having the same number of signal levels as the original signal. Thus, in the case of a television system for transmitting black and white copy, it is desirable to provide dual speed scanning but with the resulting video signal being a binary rather than a ternary signal.

This invention recognizes that, ideally, a pulse having a duration of T seconds or longer can be transmitted by a transmission facility having a predetermined upper cut-off frequency, all pulses having a duration shorter than T being lost due to the bandpass characteristics of the system. Thus, a normal or slow scanning rate is provided which will generate a pulse having a duration T in response to the minimum width picture element. However, once such a minimum pulse has been generated, any additional length added to the pulse will also inherently be transmitted. Thus, in accordance with the invention, the first part of a run, i.e., scanning of a group of picture elements of constant brightness is scanned at the normal or slow rate in T seconds. Thus, having initiated a pulse of T duration, the remainder of the run is scanned at the fast rate. Thus, is accordance with the invention, the first part of each pulse is generated by scanning at the normal or slow rate and the second part by scanning at the fast rate.

It is accordingly an object of the invention to provide an improved system and method of time-bandwidth reduction for information transmission systems.

Another object of the invention is to provide an improved system and method of time-bandwidth reduction for information transmission systems employing dual speed scanning.

The above-mentioned and other features and objects of this invention and the manner of attaining them will become more apparent and the invention itself will be best understood by reference to the following description of an embodiment of the invention taken in conjunction with the accompanying drawings, wherein.

Figure 1:
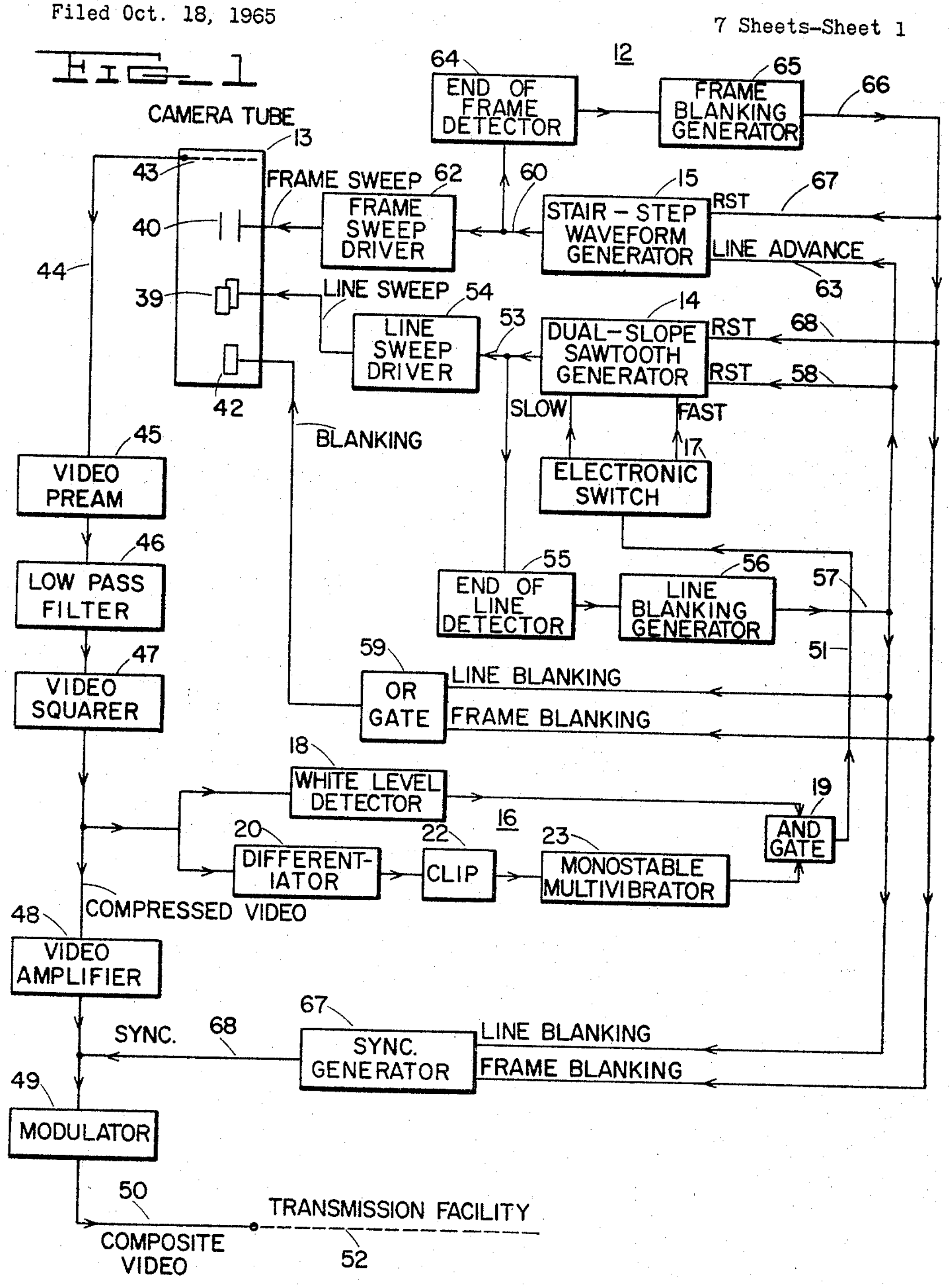
FIG. 1 is a schematic diagram illustrating the transmitting station of a television system incorporating one embodiment of the invention.
Figure 2:
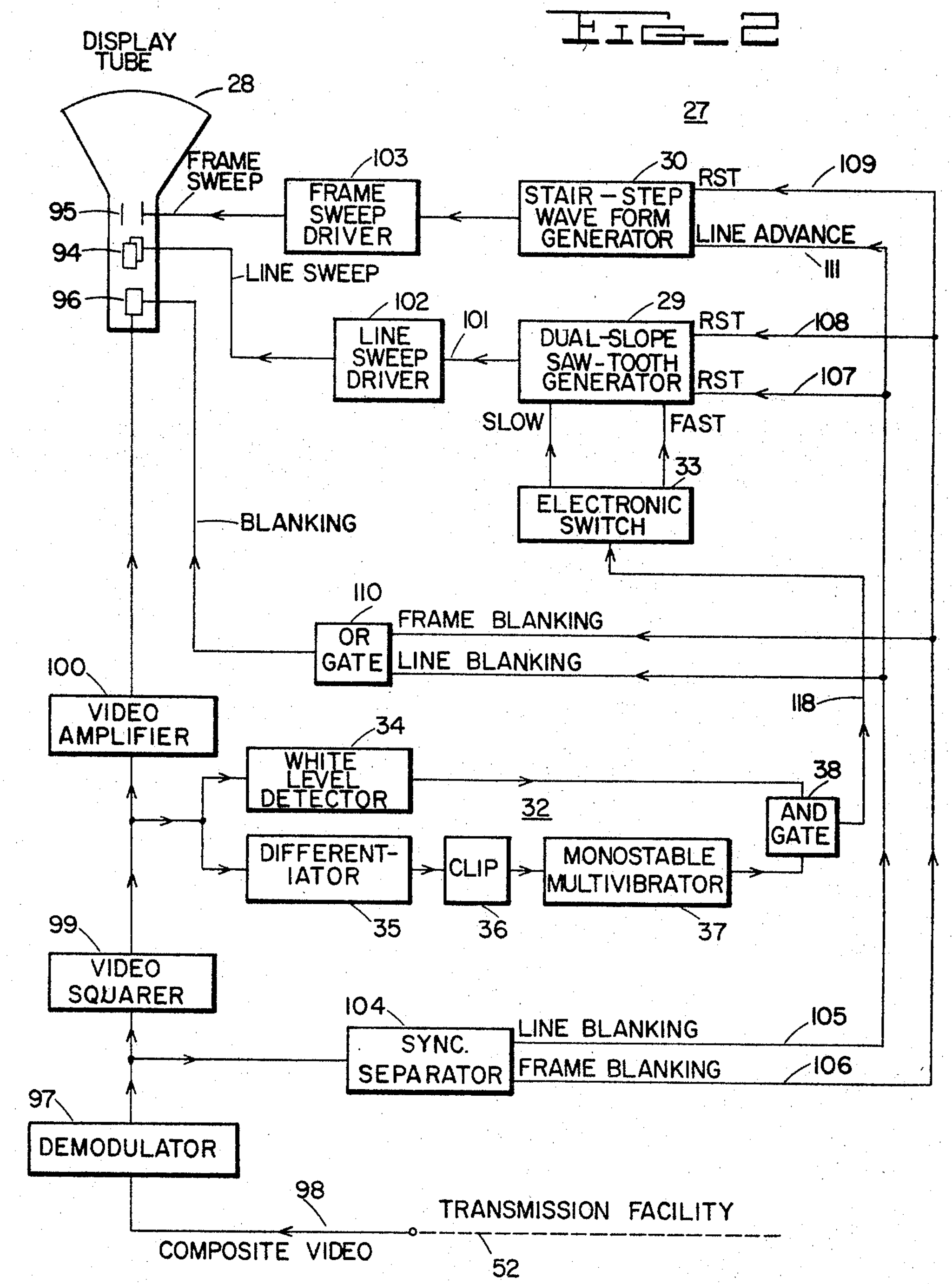
FIG. 2 is a schematic diagram illustrating the receiving station employed with the transmitting station of FIG. 1.

Referring now to FIGS. 1 and 2, the invention is shown embodied in a television system for transmitting black and white copy in which the two scanning speeds are applied only to white runs, it being assumed that white produces a positive-going video signal. Referring particularly to FIG. 1, the transmitting station of the invention, generally indicated at 12, basically comprises a conventional camera tube 13, line and frame sweep voltage generators 14 and 15, a logic circuit 16 and a scanning speed control switch 17. The video output of the camera tube 13 is transmitted directly and also is simultaneously sampled by the logic circuit 16 which actuates the switch 17 to control the line scanning speed provided by the line sweep generator 14, the logic circuit 16, switch 17 and line sweep generator 14 thus forming a feedback network.

The logic circuit 16 includes a white level detector 18 which examines the video signal produced by the camera tube 13 and provides a positive output signal during periods when white is being scanned, the output signal from the white level detector 18 being applied to AND gate 19. Logic circuit 16 also includes differentiating and clipping circuits 20 and 22 and monostable multivibrator 23. The differentiating circuit 20 generates a series of spikes in response to the transitions in the video signal and the clipping circuit 20 passes only the positive-going spikes which trigger the monostable multivibrator 23. The monostable multivibrator 23 is normally in the "one" state, i.e., providing a positive signal and when triggered produces a "zero" output, i.e., a negative pulse for a duration of T seconds. The output of the monostable multivibrator 23 is also applied to the AND gate 19 and thus, during the negative pulse output interval, the AND gate 19 is not enabled. However, at the end of the negative pulse provided by the monostable multivibrator 23, i.e., T seconds after a black-to-white transition in the video signal, the monostable multivibrator 23 reverts back to its normal state providing a positive output signal and the AND gate is then enabled for so long as an output signal is provided by the white level detector 18. The AND gate 19 thus produces an output signal following termination of the T duration pulse provided by the monostable multivibrator 23 which is applied to the switch 17.

In the absence of a signal applied to switch 17 by the AND gate 19, the line sweep generator 14 provides scanning at the normal, i.e., slow, rate. Application of the signal to the switch 17 actuates the line sweep generator 14 to provide scanning at the fast rate. At the end of the particular white run of the video signal provided by camera tube 13, i.e., a transition from white-to-black, the output signal from the white level detector 18 terminates thus terminating the output signal from the AND gate 19 so that switch 17 actuates line sweep generator 14 again to provide the slow scanning rate. Thus, the beam in the camera tube 13 sweeps at the fast rate as long as there is an output from the AND gate 19 so that all portions of white runs of video greater than T seconds are scanned at the fast rate.

The duration T of the negative pulse provided by the monostable multivibrator 23 during which normal rate line scanning is provided is chosen to correspond with the duration of the minimum width video signal pulse which can be transmitted within the bandpass characteristics of the transmission facility, the normal or slow scanning rate also being chosen so that scanning of the minimum width picture element which it is desired to transmit will provide a video signal pulse of duration T.

Referring momentarily to FIG. 3A, there is shown a video signal pulse 24, the first portion 25 of which is indicated in solid lines, having a duration T corresponding to the minimum pulse width capable of transmission, the remaining portion 26 being indicated in dashed lines. Thus, in accordance with the invention, the first portion 25 of pulse 24 having duration T is scanned and thus transmitted at the slow rate with the remaining portion 26 in excess of duration T being scanned and transmitted at the fast rate, such faster scanning and transmission being possible since any pulse having a duration longer than T will be transmitted by the transmission facility.

It will be understood that continuous frame scanning cannot be employed in the transmitting station 12 since the duration of each line scan will be different depending upon the number and durations of continuous runs of white information. Thus, a line containing all black information would be entirely scanned at the slow rate, a line containing alternate white and black elements with each white element producing a video signal pulse having duration T would likewise be entirely scanned at the slow rate, whereas a line having all white information would be entirely scanned at the fast rate after the initial normal rate scanning for T seconds. Thus, an incremental type of frame scanning must be employed which is controlled by the line scanning, i.e., the frame sweep generator 15 must advance the scanning by one line responsive to the end of each line scanned. In the illustrated embodiment, frame sweep generator 15 is a stair-step waveform generator actuated in response to detection of the end of a line scanned, as will be hereinafter more fully described.

Referring now to FIG. 2, the receiving station of the invention, generally indicated at 27, functions in a manner similar to the transmitting station and basically comprises a display tube 28, line and frame sweep voltage generators 29 and 30, a logic circuit 32 and a line scanning rate control switch 33. The input video signal from the transmission facility is continuously applied to the display tube 28 and is simultaneously examined by the logic circuit 32 which likewise comprises a white level detector 34, differentiating and clipping circuits 35 and 36, a monostable multivibrator 37 and an AND gate 38. Thus, the logic circuit 32, switch 33 and line sweep generator 29, in common with the corresponding circuits of the transmitter station 12, are coupled in a feedback network.

The white level detector 34 provides a positive output signal whenever the input video signal is white. Differentiator 35 provides spikes in response to the black-to-white and white-to-black transitions of the video signal, clipping circuit 36 eliminating the negative spikes so that only the positive spikes responsive to the black-to-white transitions are applied to the monostable multivibrator 37. Monostable multivibrator 37, in common with monostable multivibrator 23 of the transmitting station 12, generates a single negative pulse of duration T in response to each positive spike applied thereto which disables the AND gate 38. The positive output signal from the monostable multivibrator 37 is applied to the AND gate 38 along with the positive signal from the white level detector 34, the resulting output signal from the AND gate 38 being applied to the switch 33 to actuate line sweep generator 29 to provide the fast scanning rate. Thus, for the first T seconds of each white run during which the negative pulse is generated by the monostable multivibrator 37, the beam of the display tube 28 is scanned at the slow rate and beginning T seconds after the beginning of each white run, the beam is scanned at the fast rate to reconstruct the original signal on the display tube 28.

Referring again to FIG. 1, camera tube 13 may be of any conventional type, such as a vidicon tube, and is provided with conventional line and frame deflection electrodes 39 and 40, electron gun 42 and target electrode 43 to which video signal output circuit 44 is coupled. Output circuit 44 is coupled to a conventional video preamplifier 45, which, in turn, is coupled to a conventional low pass filter 46 and conventional video squaring circuit 47. Although not essentially required by the system, the filter 46 removes the high frequency components from the video signal which would not be transmitted, thus simplifying the operation of the transmitter and making it more error free. The video squaring circuit 47 is employed in the present system for transmitting black and white information for sharpening the transitions in the video signal, thereby providing a rectangular waveform with steep transitions. The output circuit of the video squaring circuit 47 is coupled to a conventional video amplifier 48 which in turn is coupled to a conventional modulator 49, it being desirable to modulate the video signal onto a carrier so that DC signal levels are transmitted. The output circuit 50 of the modultor 49 is coupled to the transmission facility 52 which may be a radio link, a coaxial cable or a telephone line. If it is desirable to utilize an ordinary voice band telephone line, the modulator described and illustrated in application Ser. No. 318,682, now Patent No. 3,286,026, of Nelson E. Hoag and Weldon W. Greutman assigned to the assignee of the present application, may be employed.

The white level detector 18 may be a conventional threshhold detector providing a positive output signal when the input signal exceeds a predetermined level, i.e., a white level video signal. Differentiating and clipping circuits 20, 22, monostable multivibrator 23 and the AND gate 19 are conventional. In the preferred embodiment, the line sweep voltage generator 14 is a dual-slope sawtooth waveform generator and may incorporate the circuits shown in FIG. 5 of FIG. 6 of the drawing, to be hereinafter described. Switch 17 may be a conventional electronic switch, such as a bistable multivibrator, for applying an appropriate potential to the dual-slope sawtooth waveform generator 14 to cause a change from the normal or slow scanning rate to fast scanning rate. Output circuit 53 of the line sweep generator 14 is coupled to a conventional line sweep driver 54 which in turn is coupled to the horizontal deflection electrodes 39 of the camera tube 13.

Output circuit 53 of the line sweep generator 14 is also coupled to an end-of-line detector 55, which may be a conventional threshold detector. which provides an output signal when the input signal, in this case the line sweep voltage, exceeds a predetermined level, i.e., the level required to deflect the beam in the camera tube 13 to the extreme end of a line. End-of-line detector 55 is coupled to a conventional line blanking generator 56 which generates a line blanking pulse in response to the signal provided by the end-of-line detector 55. Line blanking generator 56 has its output circuit 57 coupled to the reset circuit 58 of the line sweep generator 14 for resetting the sweep to initiate a new line. Output circuit 57 of the line blanking generator 56 is also coupled to OR gate 59 which in turn is coupled to the gun 42 of camera tube 13 to apply the line blanking pulse thereto for turning off the beam during a line retrace.

As indicated, frame sweep generator 15 is preferably a conventional stair-step waveform generator having its output circuit 60 coupled to a conventional frame sweep driver 62 which in turn is coupled to the frame deffection electrodes 40 of the camera tube 13. Output circuit 57 of line blanking generator 56 is coupled to the line advance input circuit 63 of the frame sweep generator 15 so that each line blanking pulse provided by the line blankign generator 56 causes the stairstep waveform generator 15 to increase its output voltage by one step. Output circuit 60 of the frame sweep generator 15 is also coupled to end-of-frame detector 64, which may be a conventional threshold detector, providing an output signal when its input signal exceeds a predetermined level, in this case the highest frame sweep voltage which is reached when the electron beam on the tube 13 has been fully deflected vertically to scan the last line of a frame. End-of-frame detector 64 is coupled to a conventional frame blanking generator 65 which generates a frame blanking pulse in response to the output signal provided by the end-of-frame detector 64. Output circuit 66 of the frame blanking generator 65 is coupled to the reset circuit 67 of the stair-step waveform generator 15 thereby to reset the frame sweep, and to the reset input circuit 68 of the line sweep generator 14 to reset the same to initiate a new line. Output circuit 66 of the frame blanking generator 65 is likewise coupled to OR gate 59 for applying the frame blanking pulse to the electron gun 42 of the camera tube 13 thereby to turn off the beam during the frame retrace.

Output circuit 57 of line blanking generator 56 and output circuit 66 of frame blanking generator 65 are also both coupled to a conventional synchronizing signal generator 67 which has its output circuit 68 coupled to the modulator 49 for superimposing line and frame synchronizing signals on the video signal, as is well known to those skilled in the art.

Referring now to FIG. 3B, there is shown a horizontal segment 69 of copy viewed by the camera tube 13 and having a black picture element 70 thereon, the element 70 being assumed to be the minimum width picture element which it is desired to transmit. The direction of line scanning of the copy 69 by the beam provided by the electron gun 42 is shown by the dashed line 72. Referring to FIG. 3C, the normal video signal which would result from scanning of the line 72 of the copy 69 without the transmission time reduction system of the invention is shown at 73, it being observed that the white areas 74–1 and 74–2 on either side of the black element 70 respectively provided positive video signals 75 and 76 whereas the black picture element 70 provides a negative video signal pulse 77. A previously indicated, the normal or slow line scanning rate provided by the line sweep generator 14 is adjusted so that the duration T of the "black" video signal pulse 77 corresponds to the minimum pulse width T which is capable of transmission within the band-pass characteristics of the transmission facility 52.

The video signal 73 is applied, as it is generated, to the differentiating circuit 20 which provides a positive spike 78–1 in response to the black-to-white transition 79–1 at the beginning of the video signal 73. The positive spike 78–1 is passed by the clipping circuit 22 and triggers monostable multivibrator 23 to generate negative pulse 80–1 having duration T, i.e., the duration of the minimum pulse T capable of transmission within the bandpass characteristics of the transmission facility 52. At the end of the negative pulse 80–1, monostable multivibrator 23 returns to its normal state providing a positive output signal 81–1 in its output circuit.

The initial white or positive video signal portion 75 of the video signal 73 is applied to the white level detector 18 which accordingly provides positive signal 82–1 in its output circuit which is applied to the AND gate 19. The positive signal 81–1 provided by the monostable multivibrator 23 at the end of the negative pulse 80–1 of T duration is likewise applied to the AND gate 19 thereby enabling the AND gate 19 to provide a positive output 83–1 in its output circuit which is applied to the electronic switch 17.

Figure 3:
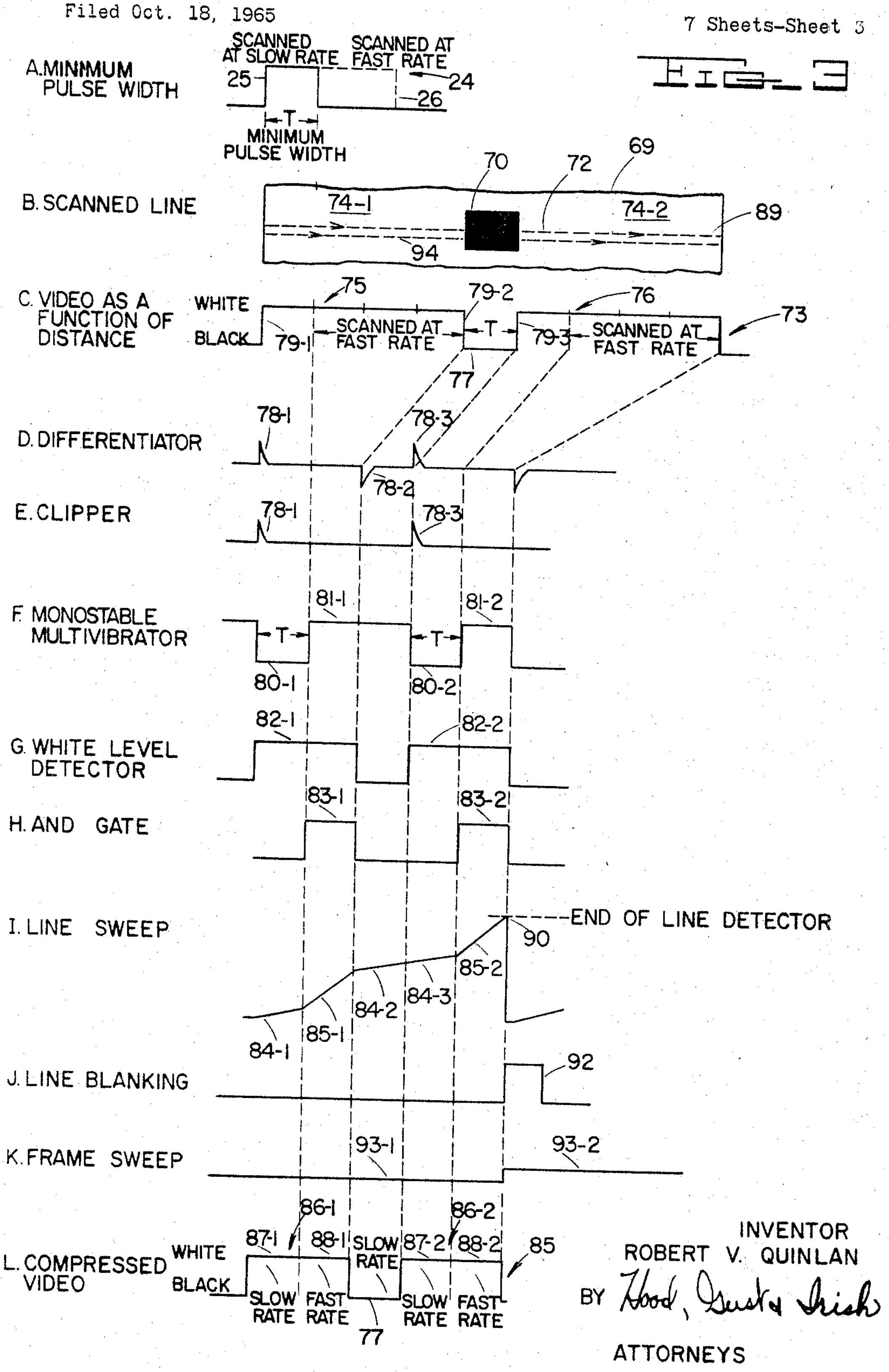
FIG. 3 is a diagram showing waveforms found in the transmitting system of FIG. 1.

The dual-slope sawtooth generator 14 is normally actuated to generate the normal or slow scanning speed sweep voltage. Thus, during the monostable multivibrator pulse 80–1 of duration T, line sweep generator 14 generates sweep voltage 84–1, as shown in FIG. 3I. However, application of the AND gate signal 83–1 to the switch 17 actuates the line sweep generator 14 to generate the fast sweep voltage 85–1, thereby in turn to scan the beam at the fast rate. In FIG. 3, the fast scanning is shown to be at a rate three times the slow rate.

When the scanning beam in the camera tube 13 reaches the end of the white area 74–1, i.e., it begins to scan the black picture element 70, a white-to-black transition 79–2 occurs in the video signal 73 as shown in FIG. 3C, the differentiator 20 thus providing a negative spike 78–2 which is, however, eliminated by the clipping circuit 22. Termination of the white signal 75 thus terminates the positive output signal 82–1 provided by the white level detector 18 in turn terminating the output signal 83–1 form the AND gate 19. Termination of the output signal 83–1 from the AND gate 19 actuates the line sweep generator 14 to provide the slow line sweep as shown at 84–2 in FIG. 3I, the beam of camera tube 13 thus scanning the black picture element 70 at the slow rate to provide the black video signal pulse 77.

By reason of the feedback connection of the logic circuit 16, switch 17 and line sweep generator 14, the video signal provided in output circuit 44 of camera tube 13 and thus applied to the modulator 49 is not as shown at 73 in FIG. 3C, but is compressed as shown at 85 in FIG. 3L. It will be seen that the white level video signal 86–1 provided in response to scanning of the white area 74–1 of the copy 69 and which corresponds to the white video signal 75 shown in FIG. 3C, includes a first part 87–1 of duration T which is scanned at the slow rate and a second part 88–1 which is scanned at the fast rate, i.e., three times the slow rate.

At the end of the black picture element 70, a black-to-white transition 79–3 occurs in the video signal with differentiator thus providing a positive spike 78–3 which is passed by the clipping circuit 22 and which triggers the monostable multivibrator 23 to generate another timing pulse 80–2 of duration T. Application of the white level video signal 76 provided in response to scanning of the white area 74–2 to the white level detector 18 provides another positive output signal 82–2 which is applied to the AND gate 19 along with the positive output signal 81–2 provided by the monostable multivibrator 23 following termination of the timing pulse 80–2, the AND gate 19 thus providing a positive output signal 83–2 which is applied to actuate switch 17 which in turn actuates the line sweep generator 14 to provide the fast sweep as shown at 85–2.

When the scanning beam reaches the end of the line, as shown at 89 in FIG. 3B, the line sweep voltage 85–2 provided by the line sweep generator 19 reaches level 90 which is detected by the end-of-line detector 55 which thus provides a signal to trigger line blanking generator 56 to generate line blanking pulse 92, as shown in FIG. 3J. During the line scan 72 of the copy 69 above-described, the frame sweep generator 15 provides a frame sweep voltage as shown at 93–1 in FIG. 3K. The line blanking pulse 92 is applied to the line advance input 63 of the stair-step waveform frame sweep generator 15 which actuated it to step-up the line sweep voltage by one increment, as shown at 93–2 in FIG. 3K, thereby to cause the beam of the camera tube 13 to scan the next line of the copy 69, as shown at 94 in FIG. 3B.

It will be seen that the resultant white video signal 86–2 provided by the camera tube 13 and applied to the modulator 49 in response to the scanning of the white area 74–2 of the copy 69 and corresponding to the white video signal 76 shown in FIG. 3C again comprises a first portion 87–2 of duration T scanned at the slow rate 84–3 and a second portion 88–2 scanned at the fast rate 85–2. It will further be seen that the line 72 of the copy 69, if entirely scanned at the slow rate, would comprise nine picture elements of duration T, i.e., one black element and eight white elements. By reason of the scanning of the white elements at a rate three time the slow scanning rate following scanning of the initial portion of duration T at the slow rate, the resulting video signal 85 comprises only five elements, i.e., one black and four white, as shown in FIG. 3L. It will thus be seen that the time required to transmit the line 72 over the transmission facility 52 has been reduced by approximately 55% over that which would have been required if the entire line was transmitted at the slow rate, this increase in transmission rate being accomplished, however, without loss of resolution, i.e., with all video signal pulses applied to the transmission facility having a duration capable of transmission within the bandpass characteristics of the transmission facility.

Referring now more particularly to FIG. 2, the display tube 28 may be any conventional direct viewing cathode ray tube, either of the instantaneously display or storage varieties. Display tube 28 includes conventional line and frame deflection electrodes 94 and 95 and conventional electron gun 96 having the usual control grid and beam forming the accelerating elements.

Demodulator 97 has its input circuit 98 coupled to transmission facility for receiving the video signal. If the transmission facility 52 is a voice-band telephone line, demodulator 97 may be of the type described and illustrated in the aforementioned Greutman-Hoag application. Demodulator 97 is coupled to conventional video squaring circuit 99 and conventional video amplifier 100 which is coupled to the control grid of the electron gun 96 of the display tube 28.

Dual-slope sawtooth waveform line sweep generator 29 is provided which may be identical to the line sweep generator 14 of the transmitting station 12. Line sweep generator 29 is coupled to the line deflection electrodes 94 of display tube 28 by conventional line sweep driver 102. Stair-step waveform frame sweep generator 30 is provided, which may be identical to the stair-step waveform frame sweep generator 15 at the transmitting station 12, frame sweep generator 30 being coupled to the frame deflection electrodes 95 of the display tube 28 by conventional frame sweep driver 103.

A conventional synchronizing signal separating circuit 104 is provided coupled to the output circuit of the demodulator 97 for separating the line and frame synchronizing signals and respectively providing line and frame blanking signals in its output circuits 105 and 106. Line blanking signal output circuit 105 of the synchronizing signal separator circuit 104 is coupled to reset input circuit 107 of the line sweep generator 29 and the line advance input circuit 111 of the frame sweep generator 30. Frame blanking pulse output circuit 106 of the synchronizing signal separating circuit 104 is coupled to the reset circuit 108 of the line sweep generator 29 and to the reset circuit 109 of the frame sweep generator circuit 30. The line and frame blanking signal circuits 105 and 106 are both connected to conventional OR gate 110 which is coupled to the electron gun 96 of display tube 28 for cutting off the electron beam during line and frame retrace.

Logic circuit 32 and electronic switch 33 may be identical to the logic circuit 16 and electronic switch 17 of the transmitting station 12 and are coupled in a feedback network in the same fashion.

Figure 4:
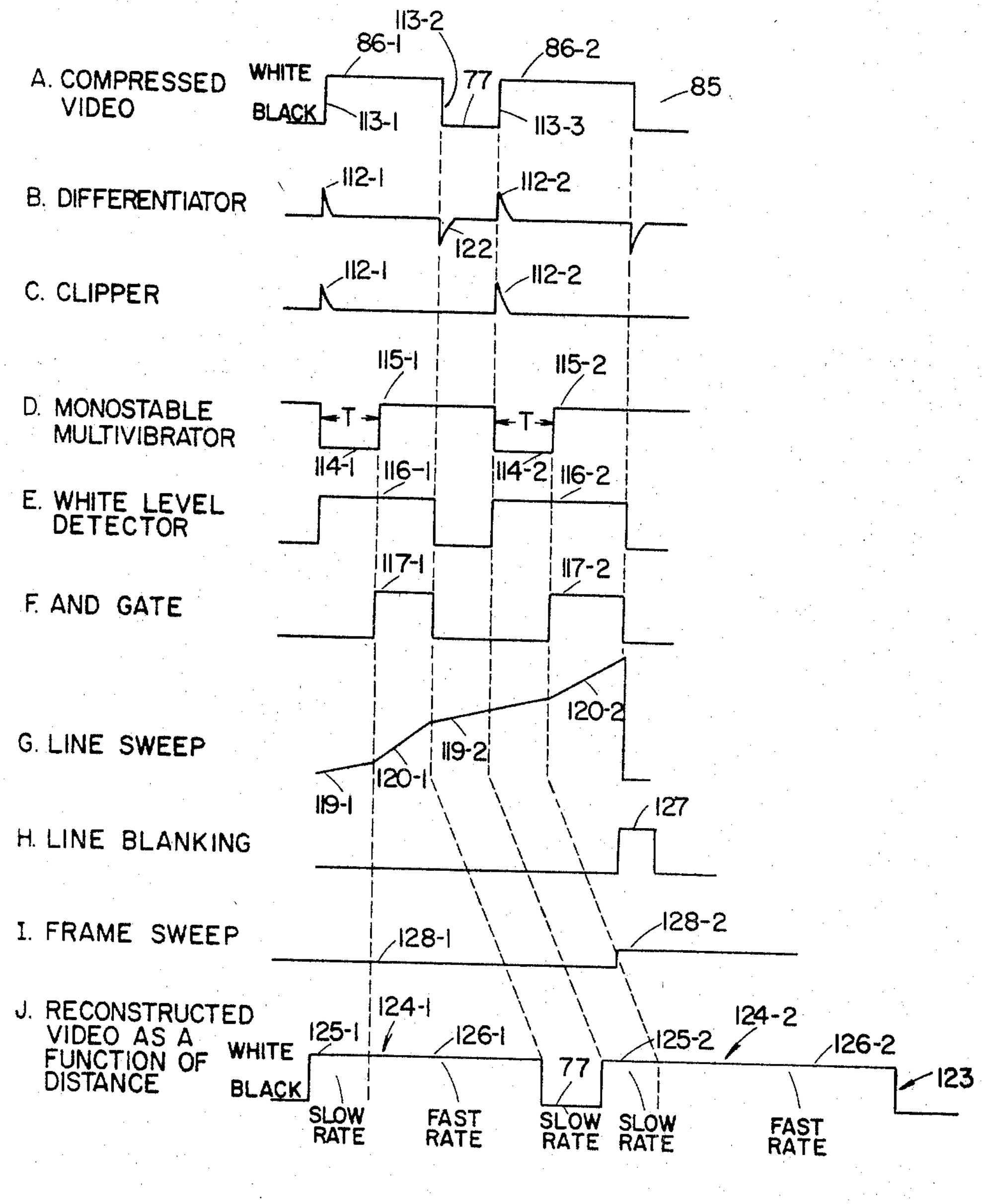
FIG. 4 is a diagram showing waveforms in the receiving system of FIG. 2.

Referring now additionally to FIG. 4, the compressed video signal 85 is shown in FIG. 4A which, when applied to the modulator 49 of the transmitting station 12, is received at the receiving station 27 and appears in the output circuit of the video squaring circuit 99. Differentiating circuit 35 provides a positive spike 112–1 in response to the black-to-white transition 113–1 of white video signal 86–1 of the video signal 85, positive spike 112–1 being passed by the clipping circuit 36 and triggers monostable multivibrator 37 to generate negative timing pulse 114–1 of duration T. At the end of negative timing pulse 114, monostable multivibrator 37 returns to its normal state to provide positive signal 115–1 to the AND gate 38. White video signal 86–1 is applied to white level detector 34 which thus provides a positive output signal 116–1 which is also applied to the AND gate 38. At the end of the timing pulse 114–1 when positive signals 115–1 and 116–1 are both applied to the AND gate 38 by the monostable multivibrator 37 and the white level detector 34, respectively, AND gate 38 is enabled to provide positive signal 117–1 in its output circuit 118.

During the negative timing pulse 114–1 provided by the monostable multivibrator 37, switch 33 actuates the line sweep generator 29 to scan the beam of the display tube 28 at the slow rate, as shown at 119–1 in FIG. 4G. Application of the positive signal 117–1 provided by the AND gate 38 to switch 33 actuates the line sweep generator 29 to scan the beam of the display tube 28 at the fast rate as shown at 120–1 in FIG. 4G. The white-to-black transition 113–2 at the end of the white video signal 86–1 results in generation of negative spike 122 by the differentiating circuit 35, which, however, is clipped by the clipping circuit 36. The end of the white video signal 86–1, however, terminates the positive output signal 116–1 provided by the white level detector 34 and in turn the positive output signal 117–1 provided by the AND gate 38, thereby actuating switch 33 to actuate line sweep generator 29 to return to the slow scanning rate as shown at 119–2 in FIG. 4G.

As a result of this dual-speed scanning of the electron beam in the display tube 28, the beam scans as though at a constant slow rate in response to a video signal as shown at 123 in FIG. 4J, it being observed that the white signal 124–1 corresponds to the white signal 75 shown in FIG. 3B, the white signal 124–1 having a first portion 125–1 which is scanned at the slow rate 119–1 for duration T and a second portion 126–1 which is scanned at the fast rate 120–1 the, black signal pulse 77 likewise being scanned at the slow rate 119–2 by reason of the termination of the output signal 117–1 from the AND gate 38.

The black-to-white transition 113–3 at the beginning of the white video signal 86–2 of the compressed video signal 85 results in the generation of positive spike 112–2 by differentiating circuit 35 which is passed by the clipping circuit 36 and actuates the monostable multivibrator 37 to generate timing pulse 114–2 of duration T, the monostable multivibrator returning to its normal condition to provide a positive output signal 115–2 applied to the AND gate 38 at the end of the timing pulse 114–2. White level detector 34 provides positive output signal 116–2 in response to the white video signal 86–2 which is applied to the AND gate 38, AND gate 38 being enabled by simultaneous application of the positive signals 115–2 and 116–2 to provide positive output signal 117–2 which actuates switch 33 to actuate the line sweep generator 29 to provide the fast sweep rate 120–2. As a result, the beam is scanned as though at a constant rate in response to a white video signal, as shown at 124–2 in FIG. 4J the first portion 125–2 of duration T being actually scanned at the slow rate and the second portion 126–2 being scanned at the fast rate.

At the end of the line being scanned, blanking signal 127 is provided by the synchronizing signal separating circuit 104 which resets the line sweep generator 29 to initiate a new line sweep and advances the frame sweep generator 30 from frame sweep voltage 128–1 to the next higher frame sweep voltage 128–2 as shown in FIG. 4I.

Figure 5:
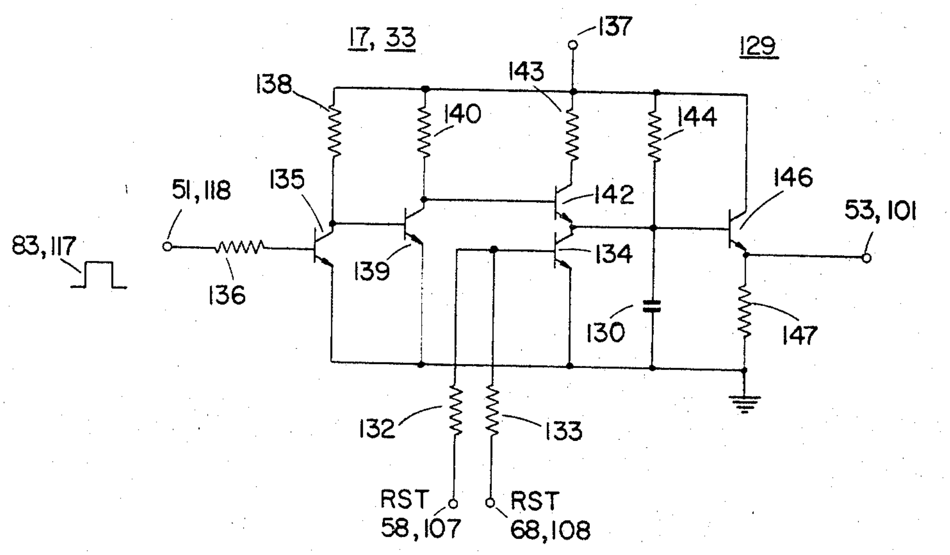
FIG. 5 is a schematic diagram showing one form of dual-slope sawtooth sweep voltage generator which may be employed in the system of FIGS. 1 and 2.
Figure 6:
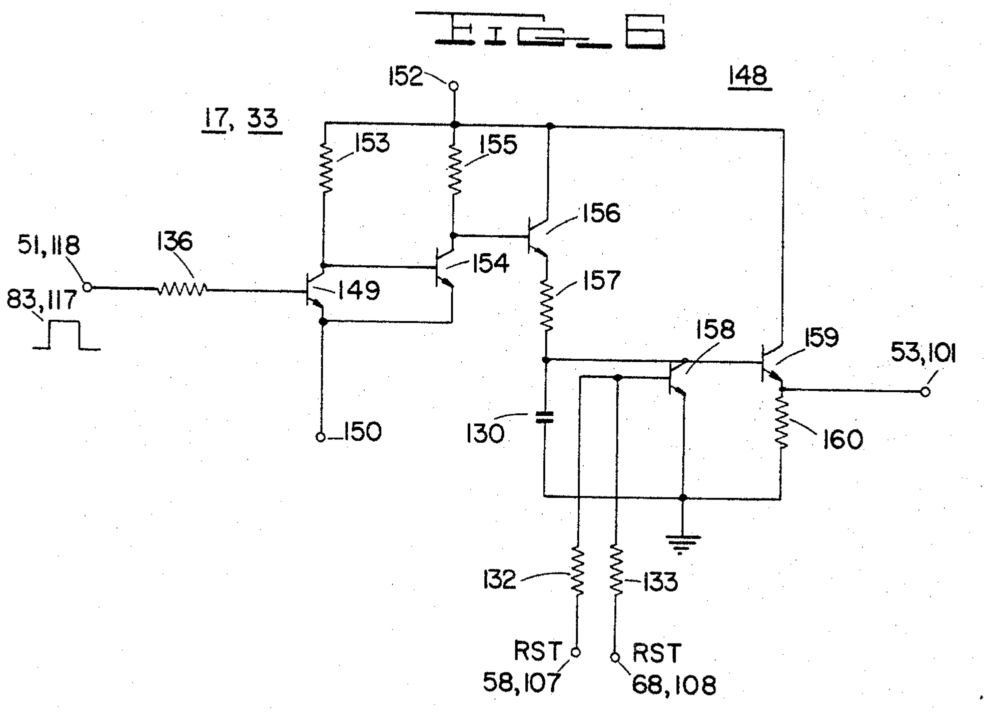
FIG. 6 is a schematic diagram showing another form of dual-slope sawtooth sweep voltage generator.

Referring now to the dual-slope sawtooth line sweep generators 14, 29, the deflection of an electron beam is controlled by a time-varying voltage or current. For rectilinear scanning in which the beam is deflected along a straight line, a sawtooth waveform voltage is used almost exclusively. Such a sawtooth waveform is generated by the charging or discharging of a capacitor. Scanning speed is proportional to the slope of the waveform and thus is proportional to the charging potential of the capacitor and inversely proportional to the RC time constant of the capacitor charging circuit. Thus, by changing either parameter, i.e., the charging potential or the time constant, ususally accomplished by changing the resistance, the slope of the deflection sawtooth voltage can be varied. FIGS. 5 and 6 of the drawings illustrate circuits which may be used for the dual-slope sawtooth waveform line sweep generators 15, 29.

Referring now to FIG. 5, there is shown a dual-slope sawtooth sweep voltage generator, generally indicated at 129, of the parallel resistance type, i.e., in which the resistance to which the charging capacitor 130 charges is changed. Resistors 132 and 133 respectively couple the reset circuits 58, 107 and 68, 108 of the line sweep generators 14, 29 to the base of transistor 134 and thus form an OR gate for resetting the sawtooth generator 129 by the line or frame blanking pulse. A positive line or frame blanking pulse applied to either resistor 132 or resistor 133 causes transistor 134 to saturate, thus discharging capacitor 130 providing essentially zero output voltage at the output circuits 53, 101.

Input circuits 51, 118 from the AND gate 19, 38 is coupled to the base of transistor 135 by resistor 136. Transistor 135 has its emitter connected to ground and its collector connected to a suitable source 137 of positive potential by resistor 138. The collector of transistor 135 is coupled to the base of transistor 139 which has its emitter connected to ground and its collector connected to source 137 by resistor 140. The collector of transistor 139 is coupled to the base of transistor 142 which has its emitter connected to the collector of transistor 134 and its collector connected to source 137 by resistor 143. Charging capacitor 130 is connected to source 137 by resistor 144, the emitter of transistor 142 and collector of transistor 134 being coupled to the midpoint 145 between resistor 144 and capacitor 130. Midpoint 145 is connected to the base of resistor 146 which has its collector directly connected to source 137 and its emitter connected to ground by resistor 147 and to the output circuit 53, 101, transistor 146 thus being connected in an emitter follower configuration.

When the resetting blanking pulse is removed from the base of transistor 134, capacitor 130 begins to charge through resistor 144 producing the slow rate sawtooth output signal 84, 119 having a time constant $R_1$ C, $R_1$ being resistor 144. By paralleling $R_1$ (resistor 144) with another resistor $R_2$ (resistors 140 and 143), the time constant is reduced, thus increasing the slope of the sawtooth voltage, as at 85, 120, causing the beam to scan at a faster rate.

When the positive signal 83, 117 at the output of the AND gate 19, 38 is applied to input circuit 51, 118, transistor 135 saturates cutting off transistor 139 and causing transistor 142 to saturate. With transistor 142 saturated, its dynamic impedance is very small, thus providing additional charging paths for charging capacitor 130 through resistors 140, 143. Thus, the time constant becomes the product of capacitor 130 and the parallel combination of resistors 140, 143 and 144. When the positive signal 83, 117 is removed, transistor 135 is cutoff causing transistor 139 to saturate. The voltage drop between the emitter of transistor 142 and its base backbiases the junction and transistor 142 thus appears as an open circuit. In this condition, only resistor 144 is connected in circuit with the charging capacitor 130 and the time constant thus returns to $R_1C$ (144, 130).

Referring now to FIG. 6, another dual-slope sawtooth waveform voltage generating circuit is shown, generally indicated at 148, which may be used for a dual-slope sawtooth line sweep generator 14, 29. In this circuit, the sawtooth waveform is changed by changing the charging voltage. Here, resistors 132, 133 respectively coupled to the resetting circuits 58, 107 and 68, 108 form the OR gate and provide for resetting the sawtooth generator 148 in a manner analogous to that provided in circuit 129 of FIG. 5. Thus, charging capacitor 130 is clamped to essentially zero volts at the beginning of each line scan.

Input circuit 51, 118 from the AND gate 19, 38 is coupled by resistor 136 to the base of transistor 149 which has its emitter connected to a first source 150 of suitable potential ($+V_1$) and its collector coupled to a second source 152 of suitable potential ($+V_2$) by resistor 153. To provide proper biasing, source 152 ($+V_2$) is more positive than source 150 ($+V_1$). The emitter of transistor 149 is coupled to the emitter of transistor 154 and its collector is coupled to the base of transistor 154 which has its collector connected to source 152 by resistor 155. The collector of transistor 154 is coupled to the base of transistor 156 which has its collector connected to source 152 and its emitter connected in series with charging capacitor 130 by resistor 157. Resetting resistors 132, 133 are coupled to the base of transistor 158 which has its emitter connected to ground and its collector connected to the base of transistor 159, which has its emitter connected to ground by resistor 160 and to the output circuit 53, 101 and its collector connected to the source 152, transistor 159 thus being connected in the emitter follower configuration. In the absence of input signal 83, 117 from the AND gate 19, 38, transistor 149 is cutoff and transistor 154 is driven into saturation with its collector voltage thus being clamped at voltage $+V_1$ (150). Transistor 156, which functions as an emitter follower, thus provides an apparent charging voltage for capacitor 130 of $+V_1$ (150) and capacitor 130 thus charges through resistor 157 to provide the slow scanning rate 84, 119.

When the positive signal 83, 117 from the AND gate 19, 38 is applied to input circuit 51, 118, transistor 149 is saturated and cuts off transistor 154. The voltage at the collector of transistor 154 is thus increased to $+V_2$ (152) which increases the output of the emitter follower transistor 156 to $+V_2$ (152). During this condition, capacitor 130 charges through resistor 157 to voltage $+V_2$ (152). This increase in the charging voltage applied across capacitor 130 causes the slope 85, 120 of the output sawtooth waveform to increase due to the change in charging voltage.

Figure 7:
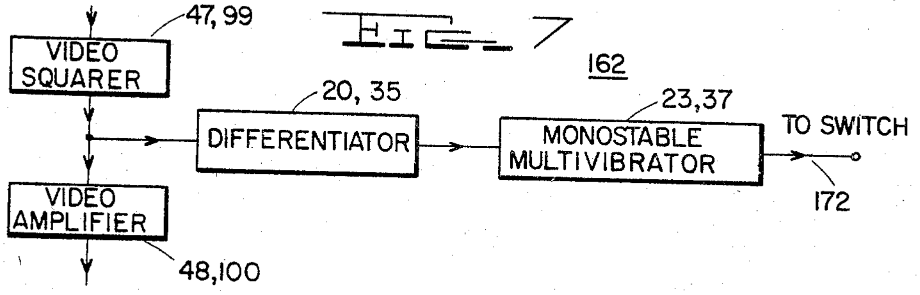
FIG. 7 is a fragmentary schematic diagram illustrating a modification of the invention in which the two scanning speeds are applied to both "black" and "white" runs.

The logic circuits 16, 32 of the transmitting and receiving stations 12, 27 of FIGS. 1 and 2 are employed for the compression of white information only; in the case of typical typewritten copy where the bulk of the black information is at or close to the minimum width and thus, the bulk of the redundancy occurs in the white information, it is ordinarily only necessary to compress the white information. However, considerable black redundancy may be present in other types of copy and, therefore, it may be desirable to compress both black and white information. Referring now to FIG. 7, there is shown a logic circuit, generally identified at 162, for compressing both black and white information and which may be employed in identical form in both the transmitting and receiving stations. Here, with like elements being indicated by like reference numerals, the differentiator 20, 35 and monostable multivibrator 23, 37 of the logic circuit 16, 32 is retained, the clipping circuit 22, 36, white level detector 18, 34 and AND gate 19, 38 being eliminated.

Figure 8:
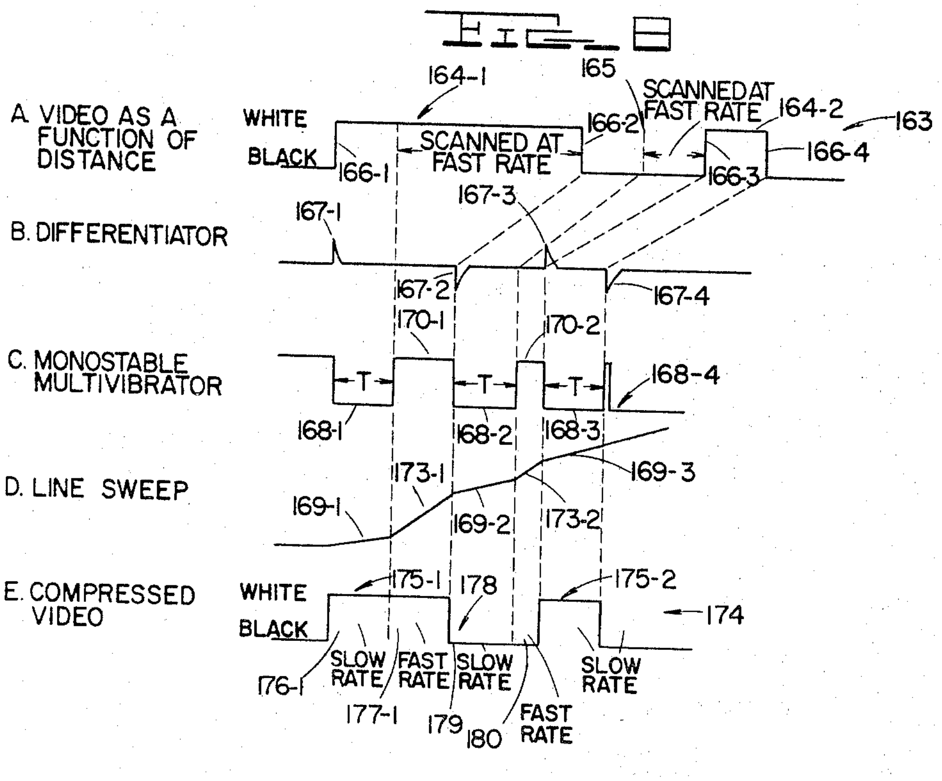
FIG. 8 is a diagram showing waveforms found in the system of FIG. 7.

Referring now to FIG. 8A, a video signal 163 is shown in the form in which it would appear if the entire line were scanned at a constant rate, video signal 163 being formed of white elements 164–1 and 164–2 and a black element 165. The black-to-white transition 166–1 at the beginning of the white video signal element 164–1 is differentiated by the differentiator 20, 35 to provide positive spike 167–1 which triggers the monostable multivibrator 23, 37 to generate timing pulse 168–1 of T duration.

During the timing pulse 168–1, the line sweep generator 14, 29 is actuated to scan at the slow rate 169–1. At the end of the timing pulse 168–1, monostable multivibrator 23, 37 returns to its normal state providing positive output voltage 170–1 in its output circuit 172 which is coupled to the switch 17, 33. Positive voltage 170–1 thus actuates the switch to cause the line sweep generator 14, 29 to scan at the fast rate 173–1.

The white-to-black transition 166–2 at the end of the white video signal element 164–1 is differentiated by differentiator 20, 35 to provide negative spike 167–2 which likewise actuates monostable multivibrator 23, 37 to initiate another timing pulse 168–2 of duration T with line sweep generator 14, 29 being actuated to return to the slow sweep 169–2. At the end of the timing pulse 168–2, monostable multivibrator 23, 37 returns to its normal state 170–2 thereby actuating switch 17, 33 to provide scanning at the fast rate 173–2.

The black-to-white transition 166–3 at the end of the black element 165 is differentiated to provide positive spike 167–3 which actuates monostable multivibrator 23, 37 to provide timing pulse 168–3 during which the line sweep generator 14, 29 provide scanning at the slow rate 169–3. White signal element 164–2 is shown to be of the minimum duration T with its white-to-black transition 166–4 resulting in the generation of negative differentiated spike 167–4. Monostable multivibrator 23, 37 will thus immediately beactuated at the end of pulse 168–3 to initiate a new timing pulse 168–4 so that the line sweep generator 14, 29 continues to scan at the slow rate 169–3.

The result is the generation of compressed video signal 174 having white element 175–1 formed of an initial portion 176–1 of duration T which is scanned at the slow rate and a final portion 177–1 which is scanned at the fast rate, a blank element 178 having an initial portion 179 of duration T scanned at the slow rate and a final portion 180 scanned at the fast rate, and a white element 175–2 of duration T which is entirely scanned at the slow rate.

While the time-bandwidth compression system of the invention has been described above in connection with the compression of white and/or black information alone, the system is also applicable to the compression of video signals having a gray scale.

Figure 9:
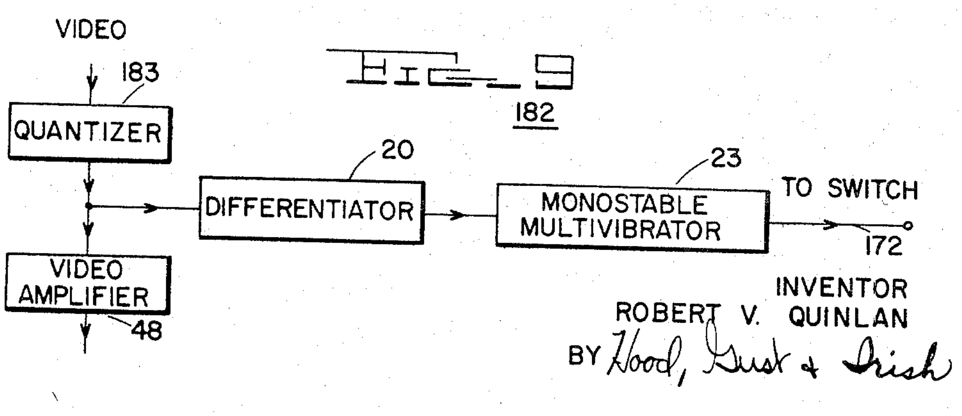
FIG. 9 is a fragmentary schematic diagram illustrating another modification of the system of the invention for the compression of multiple shades.

Referring now to FIG. 9 in which like elements are again indicated by like reference numerals, a logical circuit, generally identified at 182, is shown which again is equally applicable to the transmitting and receiving stations, the logic circuit 182 again comprising differentiator 20, 35 and monostable mutlivibrator 23, 37. At the transmitting station, a conventional quantizing circuit 183 is added for quantizing the video signal into a predetermined plurality of discrete levels prior to application to the logic circuit 182. Thus, referring to FIG. 10A, a video signal 184 is shown having a gray scale varying from white to black. For purposes of the present discussion, the quantizing circuit 183 is assumed to quantize the video signal 184 into four levels 185, 186, 187, 188, the lower and upper levels 185, 188 being black and white, respectively. The quantizing circuit 183 thus provides a quantized video signal which would appear as at 189 in FIG. 10B assuming scanning was provided at a constant rate during the entire line.

Figure 10:
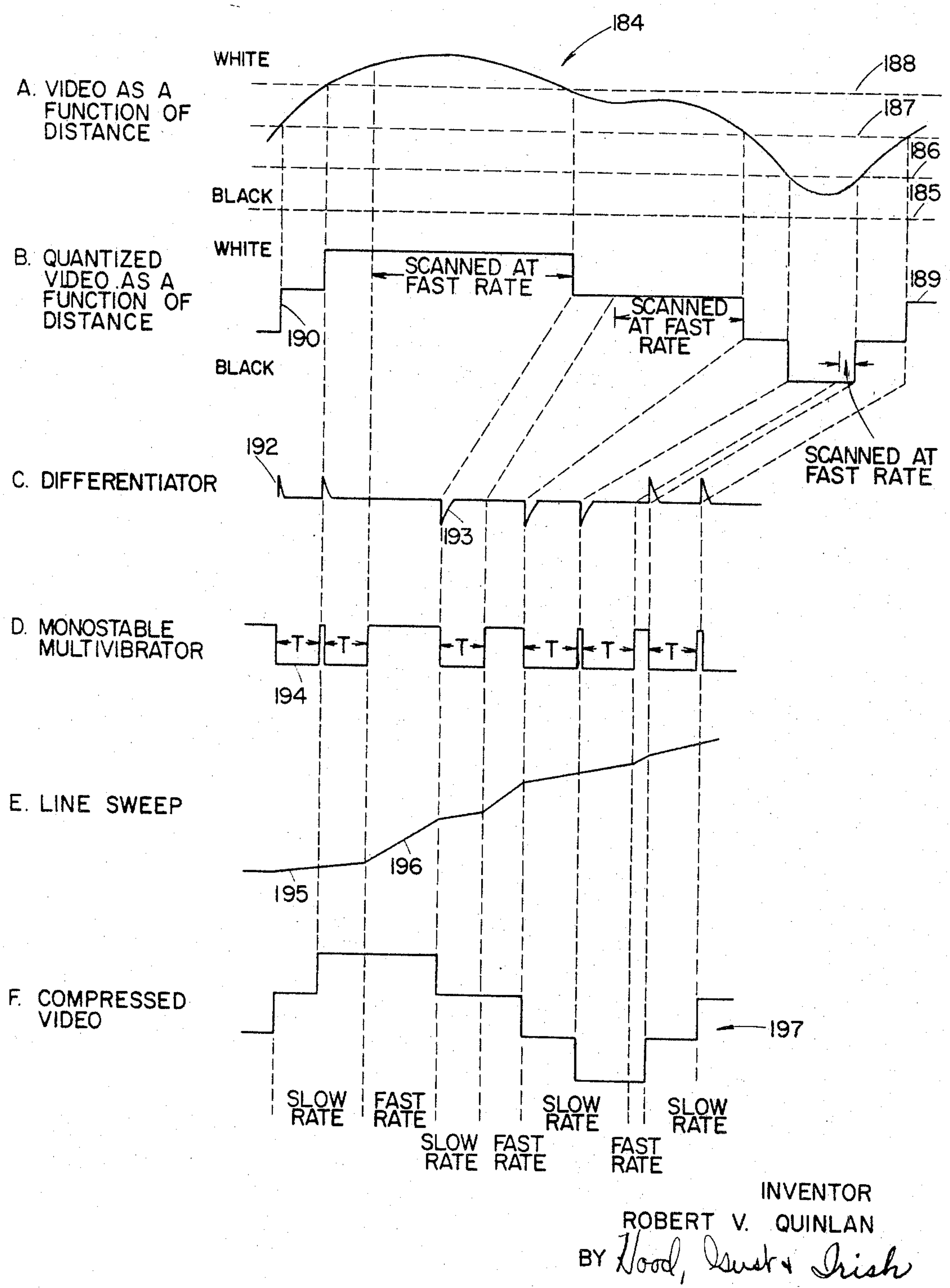
FIG. 10 is a diagram illustrating waveforms found in the system of FIG. 9.

As shown in FIGS. 10C, D, E and F, the transitions 190 between each level of the quantized signal 189, both black-toward-white and white-toward-black are differentiated and the differentiated plus and minus spikes 192, 193 trigger the monostable multivibrator 23 to generate the timing pulses 194 of T duration, i.e., a timing pulse 194 is generated in response to each transition of the quantized signal. The output from the monostable multivibrator 23 is applied to the switch 17 to acutate the line sweep generator 14 to provide the slow scanning rate 195 during the timing pulses 194 and the fast sweep rate 196 when the monostable multivibrator 23 is in its normal condition, i.e., during any quantized level having a duration longer than T. The result is a compressed video signal shown at 197 in FIG. 10F, each quantized level being formed at least of a first portion having a duration T scanned at the slow rate, and, if the picture element being scanned has a duration longer than T, a second portion which is scanned at the fast rate.

A typical page of typewritten copy comprises 5025 picture elements, the width of each element corresponding to the minimum width of a black element encountered in scanning a type-written character. Of these 5025 picture elements, 918 are black elements and 4107 are white elements which appear in 467 white runs. With fast scanning for white information only, and recalling that the first white element of each white run and all black elements are scanned at the slow rate, there will be 467 white elements (one for each white run) and 918 black elements for a total of 1385 elements scanned at the slow rate. There being a total of 4107 white elements with 467 of these, i.e., the first white element of each white run, being scanned at the slow rate, a total of 3640 white elements are scanned at the fast rae. With a ratio of fast to slow scanning rates of 2 to 1, it will be seen that the 3640 white elements which are scanned at the fast rate are scanned in the same period of time in which 1820 white elements would be scanned at the normal or slow rate. Thus, the 5025 total white and black elements are scanned with a 2 to 1 scanning ratio in the same length of time in which 3205 white and black elements (1820 white elements being half of the 3640 white elements scanned at the fast rate plus the 1385 elements scanned at the normal rate) or a reduction in transmission time of 1.6 to 1.

It will be seen that by employing a 3 to 1 ratio scanning speed, a reduction in transmission time of 1.9 to 1 would be provided with reductions of 2.2 to 1 and 2.4 to 1 being respectively provided with scanning speed ratios of 4 to 1 and 5 to 1. By compressing both white and black information in the above-referred to typical typewritten page, transmission time reductions of 1.7, 2.2, 2.6 and 2.9 are obtainable with scanning speed ratios of 2:1, 3:1, 4:1 and 5:1. With other copy having a greater black content, such as weather maps which typically include 10% black information, and with compression of both black and white information, reductions of 1.9, 2.5, 3.1 and 3.6 are obtainable with scanning speed ratios of 2:1, 3:1, 4:1 and 5:1.

It will now be seen that substantial reductions in transmission time are obtainable with the time-bandwidth reductions in transmission time are obtainable with the time-bandwidth reduction system and method of the invention with the transmitted video signal requiring no more levels than are required without compression.

While there have been described above the principles of this invention in connection with specific apparatus, it is to be clearly understood that this description is made only by way of example and not as a limitation to the scope of the invention.

What is claimed is:

1. An information transmission system comprising: means for selectively generating at relatively slow and fast rates, respectively, an initial time-based electrical signal having a characteristic responsive to the information to be transmitted; first means for sensing continuous generation of said initial signal having a predetermined said characteristic for a period in excess of predetermined period; first means for actuating said generating means to generate said signal at said slow rate during said predetermined period and at said fast rate during said excess period; means for transmitting said signal and for receiving the same at a remote location; means for selectively converting said signal at said slow and fast rates, respectively, to output information; second means for sensing reception of the transmitted signal having said predetermined characteristic for said predetermined and excess periods, respectively, and second means for actuating said converting means to convert said signal at said slow rate during said predetermined period and at said fast rate during said excess period.

2. The system of claim 1 wherein said transmitting means has a predetermined bandpass characteristic, and wherein said predetermined period is at least equal to the minimum pulse duration which can be transmitted by said transmitting means within said bandpass characteristic.

3. The system of claim 1 wherein said signal characteristic is amplitude.

4. The system of claim 1 wherein said signal characteristic is amplitude, said signal generating means generating an initial signal having at least two amplitude levels in response to said information, said predetermined signal characteristic being at least one of said levels.

5. The system of claim 4 wherein said first and second sensing means respectively include means for generating a first timing signal having a duration equal to said predetermined period in response to initiation of said one level and a second timing signal following termination of said first timing signal, said initial signal generating means and said signal converting means being respectively actuated to provide said slow rate in response to said first timing signal and said fast rate in response to said second timing signal.

6. The system of claim 1 wherein said system is a television system, said initial signal is a video signal, and said signal characteristic is amplitude; said initial signal generating means including camera tube means having first scanning means, said first actuating means including first sweep generating means coupled to said first scanning means, said first sweep generating means being selectively actuable to provide scanning at said slow and fast rates, respectively; said signal converting means including display tube means having second scanning means, said second actuating means including second sweep generating means coupled to said second scanning means, said second sweep generating means being selectively actuable to provide scanning at said slow and fast rates, respectively.

7. The system of claim 6 wherein said first and second scanning means respectively provide rectiliner scanning for said camera tube and display tube means, said first and second sweep generating means respectively including line sweep generating means, and further comprising means coupled to said first sweep generating means for detecting the end of each line scan generated thereby, and first and second frame sweep generating means for said first and second scanning means respectively, said frame sweep generating means respectively generating stair-step frame sweep voltages in response to said detecting means.

8. The system of claim 6 wherein said video signal has predetermined amplitude levels in response to said information, and wherein said predetermined characteristic is at least one of said levels.

9. The system of claim 6 wherein said video signal is a bi-level signal having predetermined upper and lower amplitude levels in response to said information, and wherein said predetermined characteristic is one of said levels.

10. The system of claim 1 wherein said initial signal has a plurality of predetermined levels with relatively steep transitions therebetween in response to said information, said predetermined characteristic being at least one of said levels, and wherein said first and second sensing means respectively comprise means for generating a first timing signal having a fixed duration equal to said predetermined period in response to a transition to said one level and a second timing signal following termination of said first timing signal, said first and second actuating means being respectively actuated to provide said slow rate in response to said first timing signal and said fast rate in response to said second timing signal.

11. The system of claim 10 wherein said first and second sensing means respectively include means for detecting said transition, said timing signal generating means respectively including pulse generating means for generating said first timing signal in response to said detecting means.

12. The system of claim 10 wherein said initial signal is a bi-level and said predetermined characteristic is one of said levels, and wherein said first and second sensing means respectively further comprises first means for detecting the transition to said one level, and second means for detecting the other of said levels, said timing signal generating means including pulse generating means for generating said first timing signal in response to said detectin means, and means for generating said second timing signal responsive to said second detecting means and said pulse generating means.

13. The system of claim 10 wherein said initial signal is a bi-level signal and said predetermined characteristic is one of said levels, and wherein said first and second sensing means respectively further comprise means for differentiating said transitions and means for clipping the differentiated transitions from said one level to the other level, means for detecting the other of said levels, said timing signal generating means including monostable multivibrator means for generating said first timing signal as a fixed duration pulse in response to said differentiating and clipping means, and comparing means coupled to said detecting means and said multivibrator means for providing said second timing signal in response to the presence of said other level and the absence of said pulse.

14. The system of claim 10 wherein said predetermined characteristic is all of said levels, and wherein said first and second sensing means respectively further comprise means for differentiating said transitions, said timing signal generating means including monostable multivibrator means for generating said first timing signal as a fixed duration pulse in response to said differentiating means and said second timing signal in the absence of said pulse.

15. The system of claim 1 wherein said system is a television system, and said initial signal is a video signal having a plurality of predetermined levels with relatively steep transitions therebetween in response to said information, said predetermined characteristic being at least one of said levels; said initial signal generating means including camera tube means having first scanning means and said signal converting means including display tube means having second scanning means; said first and second actuating means respectively comprising first and second dual-slope sawtooth line sweep generating means respectively coupled to said first and second scanning means and selectively actuable to provide scanning at said slow and fast rates, respectively, first means coupled to said first line sweep generating means for detecting the end of each line scan generated thereby, and first and second frame sweep generating means respectively coupled to said first and second scanning means and respectively generating stair-step frame sweep voltages in response to said first detecting means; said first and second sensing means respectively comprising second means for detecting a said transition to said one level, and monostable pulse generating means for generating a first timing pulse of fixed duration equal to said predetermined period in response to said second detecting means, said pulse generating means providing a second timing signal following termination of said first pulse, and means respectively coupling said pulse generating means to said first and second line sweep generating means for actuating the same to provide slow scanning rate in response to said first timing pulses and said fast scanning rate in response to said second timing signal.

16. The method of information transmission comprising the steps of: generating at a first rate an initial time-based electrical signal having a characteristic response to the information to be transmitted; sensing continuous generation of said initial signal having a predetermined said characteristic for a period of time in excess of a predetermined period; increasing the rate of generation of said initial signal to a second rate during said excess period; transmitting said initial signal and receiving the same at a remote location; converting the received signal to output information at said first rate; sensing reception of the transmitted signal having said predetermined characteristic for said predetermined and excess periods; and increasing the rate of said conversion to said second rate during said excess period.

17. The method of claim 16 wherein said initial signal characteristic is amplitude, said predetermined characteristic being a predetermined, amplitude level, and wherein said initial and transmitted signal sensing steps respectively include generating a first timing signal having a fixed duration equal to said predetermined period in response to said level and a second timing signal following generation of said first timing signal, the rates of said initial signal generation and said conversion being respectively increased in response to said second timing signals.

18. The method of claim 16 wherein said initial signal characteristic is amplitude, said initial signal being generated in a plurality of amplitude levels having relatively steep transitions therebetween in response to said information, said predetermined characteristic being at least one of said levels; wherein said initial and transmitted signal sensing steps respectively include detecting a said transition to said one level, and generating a first timing pulse having a fixed duration equal to said predetermined period in response to said detection and a second timing signal following termination of said pulse, and wherein said rates of initial signal generation and said conversion are respectively increased in response to said second timing signals.

19. The method of claim 18 wherein said initial signal is a bi-level signal and said predetermined characteristic is one of said levels, and wherein said second timing signal generating step includes the steps of detecting the other of said levels and generating said second timing signal in response to the presence of said other level and the absence of said pulse.

References Cited

UNITED STATES PATENTS

| | | | |
|---|---|---|---|
| 2,957,941 | 10/1960 | Covely | 178—6.8 |
| 2,965,709 | 12/1960 | Cherry et al. | 178—6.8 |
| 3,201,512 | 8/1965 | Mason et al. | 178—6 |
| 3,204,026 | 8/1965 | Doundoulakis | 178—6.8 |
| 3,286,026 | 11/1966 | Greutman et al. | 178—6.8 |
| 3,339,017 | 8/1967 | Quinlan | 178—6.8 |

ROBERT L. GRIFFIN, *Primary Examiner.*

R. K. ECKERT, Jr., *Assistant Examiner.*